United States Patent
Kim et al.

(10) Patent No.: US 7,502,233 B2
(45) Date of Patent: Mar. 10, 2009

(54) DC POWER SUPPLY USING EITHER AC OR DC INPUT FOR BOTH

(75) Inventors: Hyun-Jun Kim, Daejeon (KR); Dae-Young Youn, Daejeon (KR); Sang-Min Kim, Daejeon (KR)

(73) Assignee: Smart Power Solutions Inc. (KR)

( * ) Notice: Subject to any disclaimer, the term of this patent is extended or adjusted under 35 U.S.C. 154(b) by 0 days.

(21) Appl. No.: 11/612,903

(22) Filed: Dec. 19, 2006

(65) Prior Publication Data

US 2007/0195558 A1 Aug. 23, 2007

Related U.S. Application Data

(63) Continuation of application No. PCT/KR2005/001761, filed on Jun. 10, 2005.

(30) Foreign Application Priority Data

Jun. 19, 2004 (KR) ............... 10-2004-0045882

(51) Int. Cl.
```
H02M 3/335    (2006.01)
H02M 5/40     (2006.01)
H02M 5/45     (2006.01)
H02M 7/00     (2006.01)
H02M 1/00     (2007.01)
H02J 1/00     (2006.01)
H02J 3/00     (2006.01)
H02J 7/00     (2006.01)
```
(52) U.S. Cl. .............. 363/16; 363/34; 363/37; 363/142; 363/64; 363/65; 363/21.01; 363/21.05; 363/21.07; 363/21.08; 363/21.12; 363/21.13; 363/21.15; 363/21.16; 363/21.18; 363/21.1; 307/22; 307/23; 307/26; 307/64; 307/66; 307/72; 307/73; 307/74; 307/75

(58) Field of Classification Search ........... 363/16, 363/34, 37, 21, 64, 65, 142; 307/22, 23, 307/26, 64, 66, 72, 73, 74, 75

See application file for complete search history.

(56) References Cited

U.S. PATENT DOCUMENTS 3,873,846 A * 3/1975 Morio et al. ............ 363/21.1

(Continued)

FOREIGN PATENT DOCUMENTS

| JP | 05-159950 | 6/1993 |
|----|-----------|--------|
| WO | 2005/124982 | 12/2005 |

OTHER PUBLICATIONS

International Search Report for International Application No. PCT/KR2005/001761; Date of Mailing International Search Report: Sep. 28, 2005.

*Primary Examiner*—Akm E Ullah
*Assistant Examiner*—Jue Zhang
(74) *Attorney, Agent, or Firm*—Cantor Colburn LLP

(57) ABSTRACT

There is provided a power supply for AC/DC and DC/DC conversion which receives the DC power supplied from airplanes, vehicles and vessels as well as normal AC power, and converts the power to DC power and supplies it to portable electronic products. The power supply for AC/DC and DC/DC conversion includes an AC input 10, a DC input 20, a switch 30 for selecting AC input power or DC input power, a DC output 40, and a circuit used for AC/DC and DC/DC conversion 100 which converts the power input from the AC input or the DC input to DC power having predetermined values of current and voltage, and a secondary side of a transformer (TL) for AC/DC conversion inside the circuit for conversion serves as an inductor for performing DC/DC conversion. The power supply for AC/DC and DC/DC conversion is implemented in compact by providing an element capable of operating different functions upon AC/DC and DC/DC conversions respectively and decreasing the number of elements, thereby allowing an efficient and economical use of electric power and generating high power.

1 Claim, 5 Drawing Sheets

U.S. PATENT DOCUMENTS

| | | |
|---|---|---|
| 5,347,211 A | 9/1994 | Jakubowski |
| 6,064,177 A | 5/2000 | Dixon |
| 6,087,815 A * | 7/2000 | Pfeifer et al. ............... 323/282 |
| 6,134,125 A | 10/2000 | Wenzel |
| 6,459,604 B1 | 10/2002 | Youn et al. |
| 6,650,560 B2 | 11/2003 | MacDonald et al. |

* cited by examiner

3A : Position A   3B : Position B ated DC/DC power supply, and FIG. 1C is a circuit diagram of a conventional non-insulated Boost-Up DC/DC power supply.

DC POWER SUPPLY USING EITHER AC OR DC INPUT FOR BOTH

CROSS REFERENCE TO RELATED APPLICATIONS

This application is a continuation of the international application PCT/KR2005/001761, filed on Jun. 10, 2005, which claims priority to and the benefit of Korean Patent Application No. 10-2004-0045882, filed on Jun. 19, 2004, and all the benefits accruing therefrom under 35 U.S.C. 120, the contents of which in their entirety are herein incorporated by reference.

TECHNICAL FIELD

The present invention relates to a power supply, and more particularly, to a power supply for AC and DC, which receives normal AC power as well as DC power supplied from, for example, airplanes, vehicles, vessels, or the like, and supplies DC power to portable electronic products, or the like.

BACKGROUND ART

As is generally known, a portable electronic product such as a notebook computer, a PDA, a portable DVD, a camcorder, a digital camera, and a mobile phone needs appropriate DC power supplied thereto in order to charge its battery or operate itself.

The DC power is supplied from a power supply. The power supply for supplying the DC power is generally classified into two types: an AC/DC power converter which converts the AC power supplied from a house or an office building into the DC power having predetermined voltage and current levels required to operate an electronic product; and a DC/DC power converter which converts the DC power supplied from airplanes, vehicles, vessels, or the like into the DC power, which is appropriate to operate the electronic product.

However, such a power supply was inconvenient for a user, who travels a lot, to use, because he or she must carry the two kinds of power converters both.

In order to avoid the problem, it has been proposed a power supply, which is able to receive AC and DC powers both. However, the power supply is just composed of two kinds of circuits coupled to each other, which perform different functions. Therefore, even when only one type of power is used, the power supply is structured to include a component element (hereinafter, referred to as "element") for converting the other type of power therein as well. Therefore, the power supply is enlarged in size, and as a result, it is substantially impossible to carry along. Furthermore, the power supply requires a relatively large amount of power, which results in failing to realize an economic power consumption.

A typical switching mode power supply (SMPS) is a device which converts the input power supplied thereto to the power suitable for an electronic product regardless of the types of AC and DC input power, by changing the arrangement of an input condenser, a PWM control IC, a transformer or an inductor, a MOSFET switch, a diode, and an output condenser. Therefore, in the case of manufacturing a power supply for AC/DC and DC/DC conversion, which is able to receive AC and DC input power both, the power supply is provided with an element which can be commonly used for AC/DC conversion and DC/DC conversion, thereby realizing an effective power supply for AC/DC and DC/DC conversion. In the following, a conventional power supply will be described in reference to attached drawings.

FIG. 1A shows a circuit diagram of a conventional power supply, FIG. 1B is a circuit diagram of a conventional insulated DC/DC power supply, and FIG. 1C is a circuit diagram of a conventional non-insulated Boost-Up DC/DC power supply.

Referring to FIGS. 1A through 1C, each of the power supplies commonly employs an input condenser (C1 or C2), a PWM control IC (IC1 or IC2), a transformer (TL) or an inductor (L), a MOSFET switch (Q1 or Q2), a diode (D3) and an output condenser (C3).

Therefore, a key to the solution in manufacturing a power supply being capable of carrying out AC/DC and DC/DC conversion in one apparatus (referred to as "power supply for AC/DC and DC/DC conversion") is to arrange elements, which are commonly usable for AC/DC conversion and DC/DC conversion both, inside the power supply, in order to provide a more efficient and more compact apparatus.

For example, an AC/DC power supply and an insulated DC/DC power supply can be installed together in order to manufacture the power supply for AC/DC and DC/DC conversion, but the structure causes a problem, in which a transformer is not easy to manufacture due to the difference between AC input voltage (100 to 230 VAC) and DC input voltage (12 to 16 VDC), even though it is advantageous in that the secondary sides of the two power supplies are completely common.

In order to solve the above problem, U.S. Pat. No. 6,134,125 discloses a power supply for AC/DC and DC/DC conversion, which is configured to include an AC input and a DC input individually, and structured to use an auxiliary transformer upon the DC input.

However, in the case of an electronic product such as a notebook computer requiring a high power, the insulated DC/DC power supply has defects of being enlarged in size and deteriorating the efficiency in comparison with the non-insulated DC/DC power supply, and therefore, the insulated DC/DC power supply cannot be effectively used in the power supply for AC/DC and DC/DC conversion requiring a high power.

Further, U.S. Pat. No. 6,459,604 issued to the applicant of the present invention discloses a universal power supply for AC/DC and DC/DC conversion which adopts a non-insulated DC/DC power supply suitable to the electronic products requiring a high power. Further, the universal power supply has an AC/DC converter and a DC/DC converter detachably connected with each other, thereby providing easy portability, and a predetermined voltage can be selected in a DC/DC mode.

However, the U.S. Pat. No. 6,459,604 could provide a highly efficient power supply in the case of a DC input, but in the case of an AC input, the universal power supply is degraded in efficiency and increased in size since the AC input passes through two converter circuits, that is, AC/DC converter circuit and DC/DC converter circuit.

Recently, U.S. Pat. No. 6,650,560 discloses a universal power supply for AC/DC and DC/DC conversion adopting a non-insulated DC/DC power supply, which is applicable to the electronic products requiring a high power and uses a feedback portion having a programmable resistor as a common portion.

Although the U.S. Pat. No. 6,650,560 provides a dual input AC and DC power supply capable of changing an output voltage by using a feedback portion having a programmable resistor as a common portion, the dual input power supply is large in size because it cannot provide a structure of reducing its size, for example, such that commonly usable elements, such as a transformer and an inductor, are installed integrally in one unit, thereby failing to realize miniaturization of the power supply.

DISCLOSURE

[Technical Problem]

The present invention has been made in view of the above problems. Therefore, an object of the present invention is to provide a power supply for AC/DC and DC/DC conversion being capable of replacing expensive and large-sized elements, which are installed inside an AC/DC power supply and a DC/DC power supply, and structuring the elements commonly usable in one unit, thereby realizing a decrease in manufacturing costs and in size.

Another object of the present invention is to provide an inexpensive and small-sized power supply for AC/DC and DC/DC conversion capable of being applied to electronic products such as a notebook computer requiring a high power, in which at least one basic element is structured to perform different functions in accordance with conversion modes. Further, the power supply for AC/DC and DC/DC conversion uses a transformer for AC/DC conversion also as a costly large-sized inductor required in a non-insulated DC/DC power supply to pass through an AC/DC circuit or a DC/DC circuit only one time, thereby decreasing power consumption and realizing a small sized unit.

To achieve the above objects, there is provided a power supply for AC/DC and DC/DC conversion which receives the DC power supplied from airplanes, vehicles and vessels as well as normal AC power from a house and an office building, and converts the power to DC power having predetermined current and voltage values required for portable electronic products, and the power supply for AC/DC and DC/DC conversion includes an AC input 10, a DC input 20, a switch 30 for selecting AC input power or DC input power, a DC output 40, and a circuit used for AC/DC and DC/DC conversion 100 which converts the power input from the AC input 10 or the DC input 20 to predetermined DC power, and a secondary side of a transformer (TL) for AC/DC conversion inside the circuit for conversion also serves as an inductor for performing DC/DC conversion.

Further, it is provided a universal power supply for AC/DC and DC/DC conversion, which may further include, in addition to the above constitution, an output selector 50 having an array of resistors, and an adapter 60 in order to select DC output voltages adapted to electronic products to be used.

[Technical Solution]

Reference will now be made in detail to preferred embodiments of the present invention, examples of which are illustrated in the accompanying drawings.

FIG. 2 is a circuit diagram illustrating the constitution of a power supply for AC/DC and DC/DC conversion according to the present invention, in which a transformer TL for AC/DC conversion is also used as an inductor L required for non-insulated DC/DC conversion.

As shown in FIG. 2, the power supply for AC/DC and DC/DC conversion according to the present invention can serve as a transformer or an inductor depending on the variance in the position of a switch 30 to select AC or DC power in accordance with the types of input power. That is, in the power supply for AC/DC and DC/DC conversion according to the present invention, the switch 30 is positioned at the "A" position upon the input of AC power, whereas the switch 30 is positioned at the "B" position upon the input of DC power, so that the switch 30 selects the types of power.

Hereinafter, an operation principle of the present invention will now be described in detail.

First, it will be described on the case of AC/DC conversion, which receives AC power and converts the AC power to DC power. When AC input power in the range of 100 to 230 V is supplied from an outlet in a home or an office building, the switch 30 is positioned at a position indicated by "A", so that the TL functions as a transformer. At this time, since a PWM controller IC2 and a FET Q2, which belong to a DC part, are not in operation, the circuit of the power supply functions as an AC/DC conversion circuit having the same construction as that shown in FIG. 1A. Meanwhile, if a power factor correction (PFC) circuit is required, the PFC circuit may be interposed between BD and TL, so that it is not restricted to any construction of a primary circuitry of the AD/DC circuit.

Secondly, it will be described on the case of DC/DC conversion, which receives DC power and converts the DC power to DC power. When DC input power is supplied from an airplane, an automobile, a vessel or the like via a DC input 20, the switch 30 is positioned at a position indicated by "B", so that the secondary side of the TL functions as an inductor. In this case, since a PWM controller IC1 and a FET Q1, which belong to an AC part, are not in operation by a diode D1, as described above, the power supply functions as a non-insulated DC/DC conversion circuit having the same construction as that shown in FIG. 1C.

In this embodiment, a Boost-type DC/DC conversion circuit is shown, but a Buck-type DC/DC conversion circuit may be also applied to the present invention in the similar manner.

As described above, in order to make a transformer to function as an inductor, too, a value of the secondary inductance of the TL is fixed in accordance with the design of a DC/DC conversion circuit to be used, and a winding ratio of the primary side of the TL has to be adjusted based on the fixed value.

That is, since the value of the secondary inductance of the TL is proportional to an output voltage Vout, and is inversely proportional to an output current Iout and a PWM frequency fOSC, it is possible to design the transformer capable of admitting the value of the inductance required for the DC/DC conversion and the winding ratio required for the AC/DC conversion by selecting the PWM frequency fOSC suitable for the DC/DC conversion circuit.

According to the present invention, it is preferable that the PWM controller IC1 of an AC/DC conversion circuit selects IC with a fixed PWM frequency, and the PWM controller IC2 of a DC/DC conversion circuit selects IC with a variable PWM frequency.

In this embodiment, KA3843 PWM controller IC (commercially available from Fairchild Semiconductor International Corp.) capable of varying the PWM frequency within 20 to 500 KHz is used as IC2, to control a value of CT/RT and adjust the PWM frequency in a range of 20 to 250 KHz. Therefore, the inductance required for the DC/DC conversion circuit is adjusted in the order of 10 to 150 μF. As such, it is possible to embody a power supply for AC/DC and DC/DC conversion capable of supplying 60 to 120 watts, in which input voltage Vin is 11 to 18 volts and output voltage Vout is 15 to 24 volts.

If the value of the inductance of the DC/DC conversion circuit is determined, the AC/DC conversion circuit determines a winding ratio of the transformer, a capacity of a condenser, diode and FET by the same method as that of manufacturing a conventional AC/DC conversion circuit. Since the method for determining the values depends on the standard defined in a data sheet of the selected PWM IC, the indication of specific values will be omitted herein.

Also, it is necessary to determine a feedback (F/B) method associated with ON/OFF of the FET in the SMPS circuit in order to obtain a desired output voltage. In general, an optocoupler is used for the AC/DC conversion, while an internal reference voltage in the PWM IC is used for the DC/DC conversion. In order to obtain a high efficiency with an inexpensive cost, the power supply for AC/DC and DC/DC conversion according to the present invention may use a programmable shunt regulator (for example, KA431, commercially available from Fairchild Semiconductor International Corp.) having 2.5 volts of a reference voltage as IC3, and a dual optocoupler (for example, PC827, commercially available from Sharp Electronics Corp.) as U1 and U2, thereby producing a desired output voltage in range of 16 to 24 volts.

Finally, in order to embody an appropriate power supply for AC/DC and DC/DC conversion, a protective circuit function should be added to the power supply. Regarding this, although the protective circuit should be made properly depending on the characteristics of power supplies, the protective circuits added to the power supply can be easily employed by those skilled in the art. As such, the detailed construction thereof is not described herein.

As described above, if the power supply for AC/DC and DC/DC conversion is provided with the transformer which functions as an inductor upon DC/DC conversion shown in FIG. 2 in accordance with the present invention, the entire secondary-side of the transformer of the AC/DC power supply is commonly used upon AC/DC conversion and DC/DC conversion. Further, a bulky component of the elements in the DC/DC power supply is only a DC input condenser C2. Therefore, according to the present invention, it is provided a power supply for AC/DC and DC/DC conversion capable of being embodied in the substantially same size as that of a conventional AC/DC power supply.

FIG. 3 shows one embodiment of the switch circuit, and an AC input 10, a DC input 20, and a DC output 40 are structured to be outwardly exposed, and a power supplying circuit for AC/DC and DC/DC conversion 100 is provided inside a plastic case 200. Further, a sliding door 300 serving as a switch 30 is installed on the outside of the plastic case 200.

Referring to FIG. 3A, if the sliding door 300 closes the DC input 20, the switch 30 is positioned at a position indicated by "A", which is set to operate as an AC/DC power supply. If the AC input 10 is closed by shifting the sliding door 300, as shown in FIG. 3B, the switch 30 is disposed at a position indicated by "B", which is set to operate as a DC/DC power supply.

The mechanically switchable switch circuit is merely an embodiment of the present invention, and an electronically switchable switch circuit can be embodied to detect DC or AC input power and thus turn on/off a relay. Therefore, the present invention is not restricted to an exemplary method of embodying the circuit for the switch 30.

FIG. 4 shows another embodiment of the present invention, in which the present invention further includes an adapter 60 having a selection pin of the same function as that disclosed in US Publication No. 2003/0122523 which was filed in the name of the inventor of the present invention, and an output selector 50 consisting of an array of resistors, thereby providing a universal power supply for AC/DC and DC/DC conversion being capable of selecting an output voltage.

Specifically, as disclosed in US Publication No. 2003/0122523, the power supply is provided at its output with the selection pin capable of selecting three states of short circuit, contact with an anode, and contact with a cathode, such that three different output voltages can be provided by using one selection pin. At this time, voltage Vout outputted from the anode and the cathode and inputted to an electronic appliance by use of each adapter is as followings:

(1) Adapter A (opened): Vout=Vref[1+Ra/Rb]
(2) Adapter B (contacted with cathode): Vout=Vref[1+Ra*Rb*R1/(Rb+R1)]
(3) Adapter C (contacted with anode): Vout=Vref[1+Ra*R1/(Ra+R1)/Rb]

Herein, if the KA431 programmable shunt regulator having a reference voltage is selected, since Vref is 2.5 volts, a voltage can be set to a desired level when using each adapter by properly selecting values of Ra, Rb, and R1. Also, when Vref is set to 1.25 volts, the output voltage can be selected. In the case that the reference voltage is 1.25 volts, the output voltage can be obtained with 15 to 16 volts in a short circuit state, 18 to 20 volts in a cathode contact state, and 12 to 13 volts in an anode contact state, by use of Ra of 45 kohms, Rb of 3.8 kohms, and R1 of 150 kohms. Also, in the case that the reference voltage is 2.5 volts, the output voltage can be obtained with the same results by use of Ra of 20 kohms, Rb of 3.8 kohms, and R1 of 62 kohms. At this time, the resistor is not limited to the embodiment, and can be varied by determining the resistance and the output watt satisfying the formulas 1, 2, and 3. Therefore, the power supply capable of being applied to various products can be obtained.

BRIEF DESCRIPTION OF THE DRAWINGS

The above objects, other features and advantages of the present invention will become more apparent by describing the preferred embodiment thereof with reference to the accompanying drawings, in which.

INDUSTRIAL APPLICABILITY

Figure 1A:
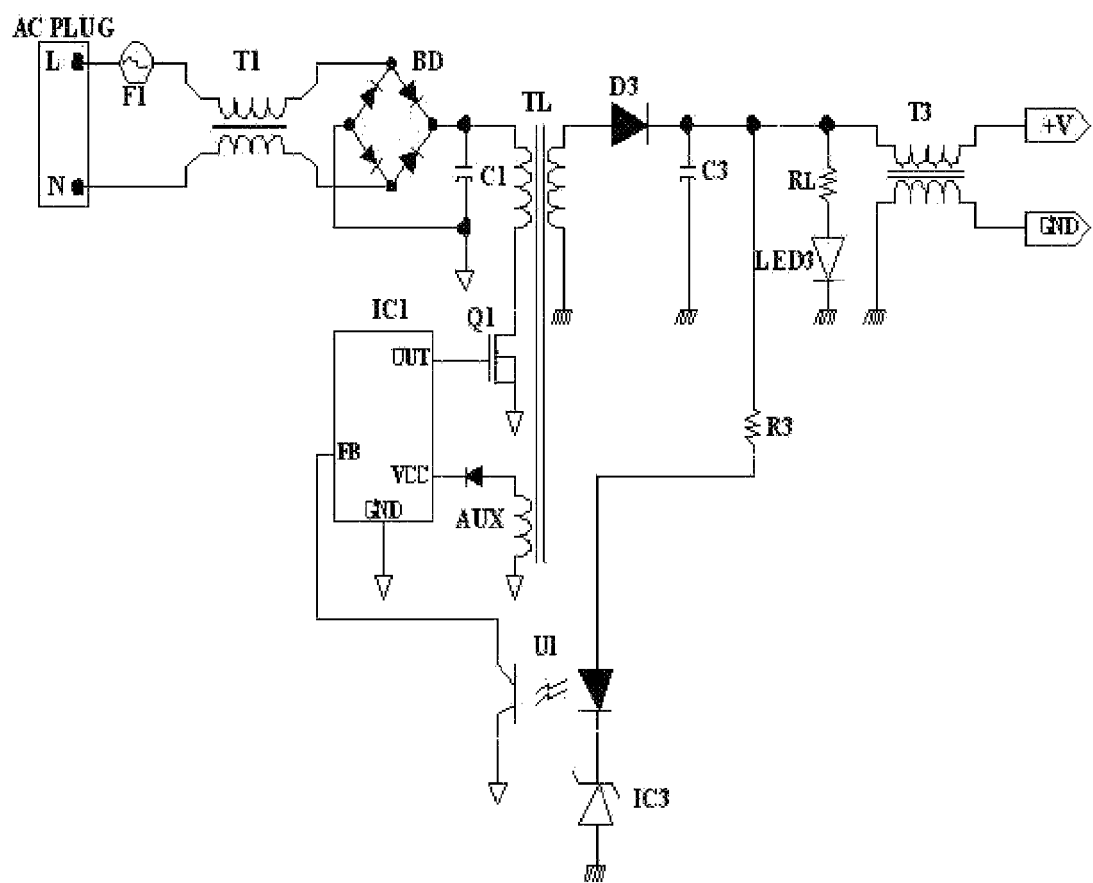
FIG. 1A is a circuit diagram illustrating the constitution of a conventional AC/DC power supply.
Figure 1B:
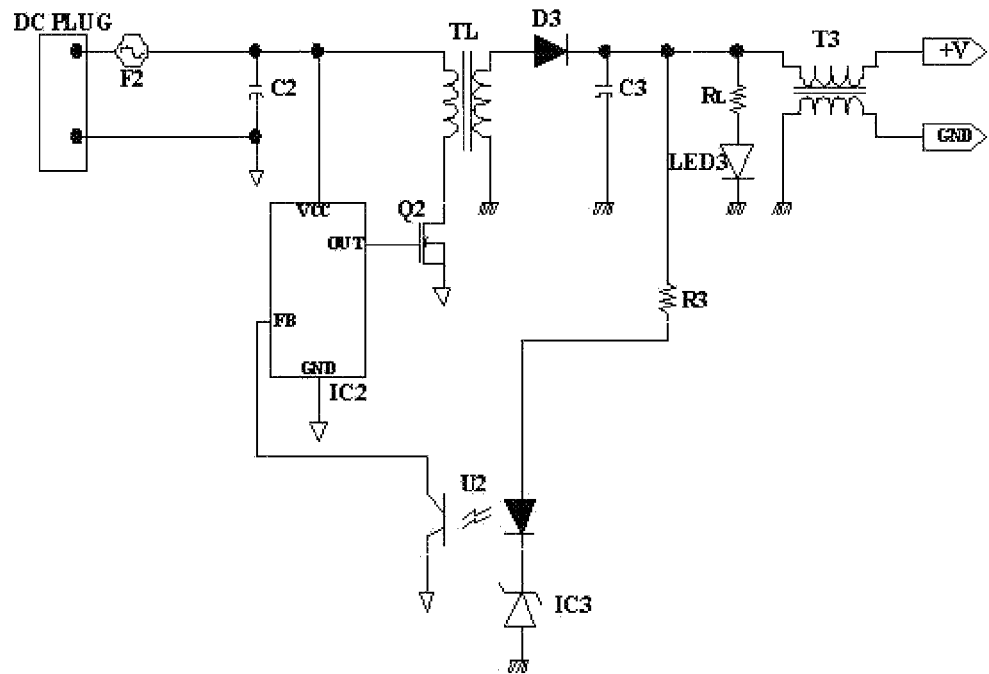
FIG. 1B is a circuit diagram illustrating the constitution of a conventional insulated DC/DC power supply.
Figure 1C:
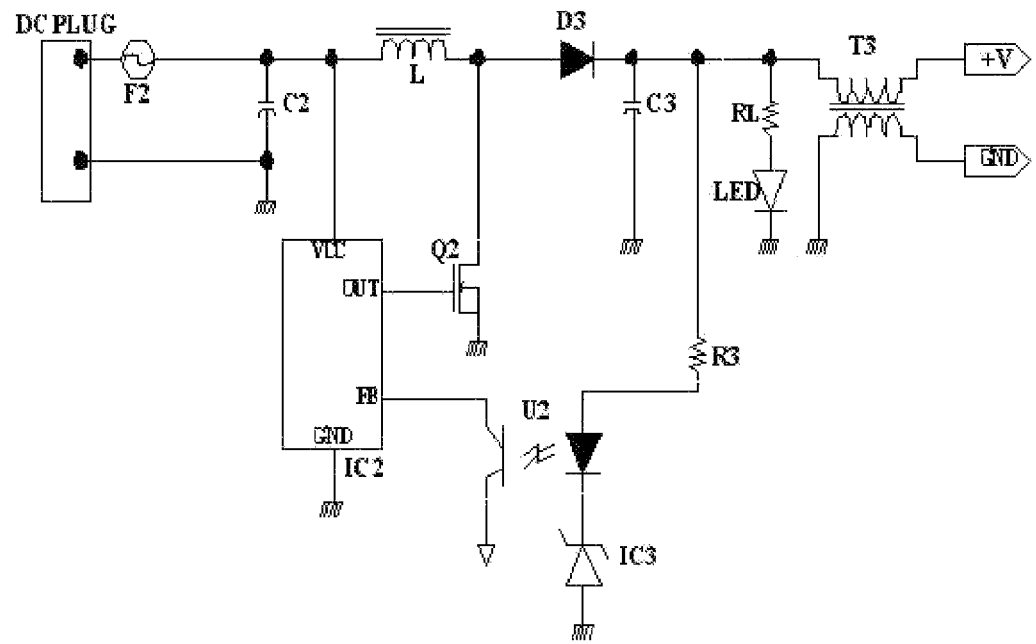
FIG. 1C is a circuit diagram illustrating the constitution of a conventional non-insulated DC/DC power supply.
Figure 2:
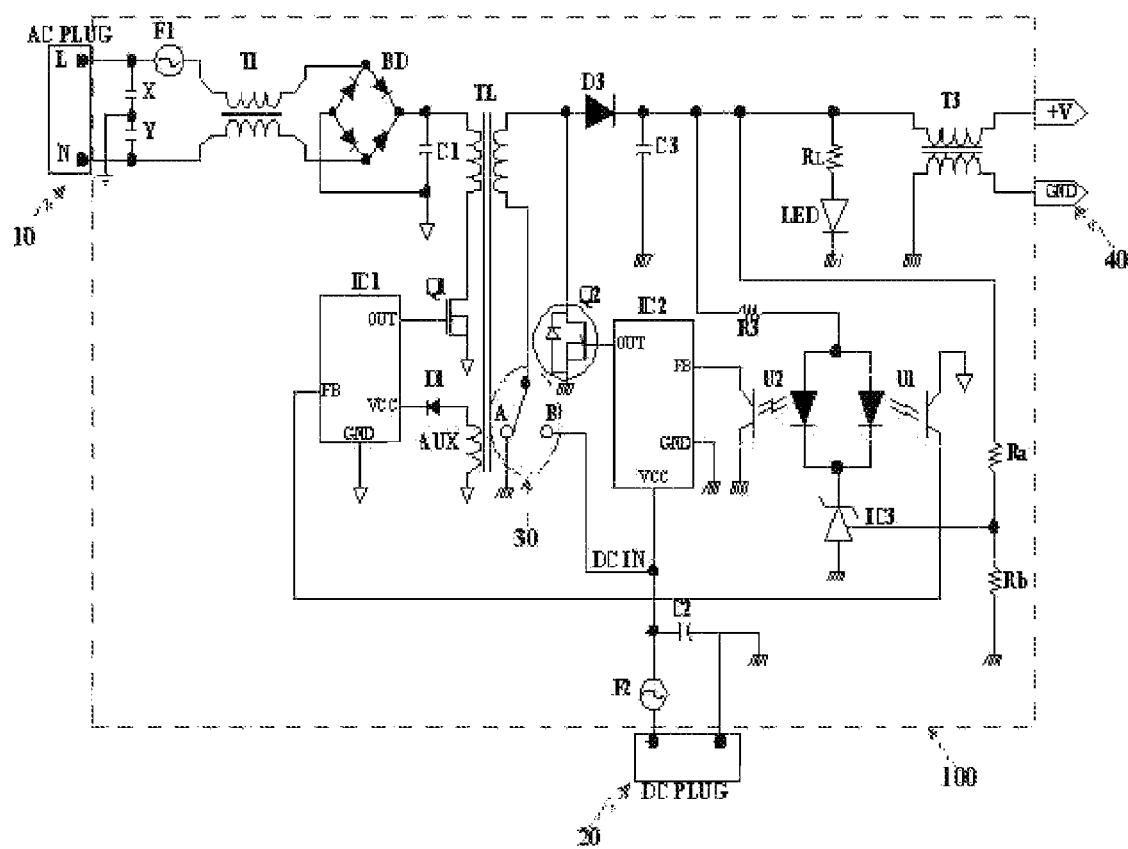
FIG. 2 is a circuit diagram illustrating the constitution of a power supply for AC/DC and DC/DC conversion according to the present invention.
Figure 3:
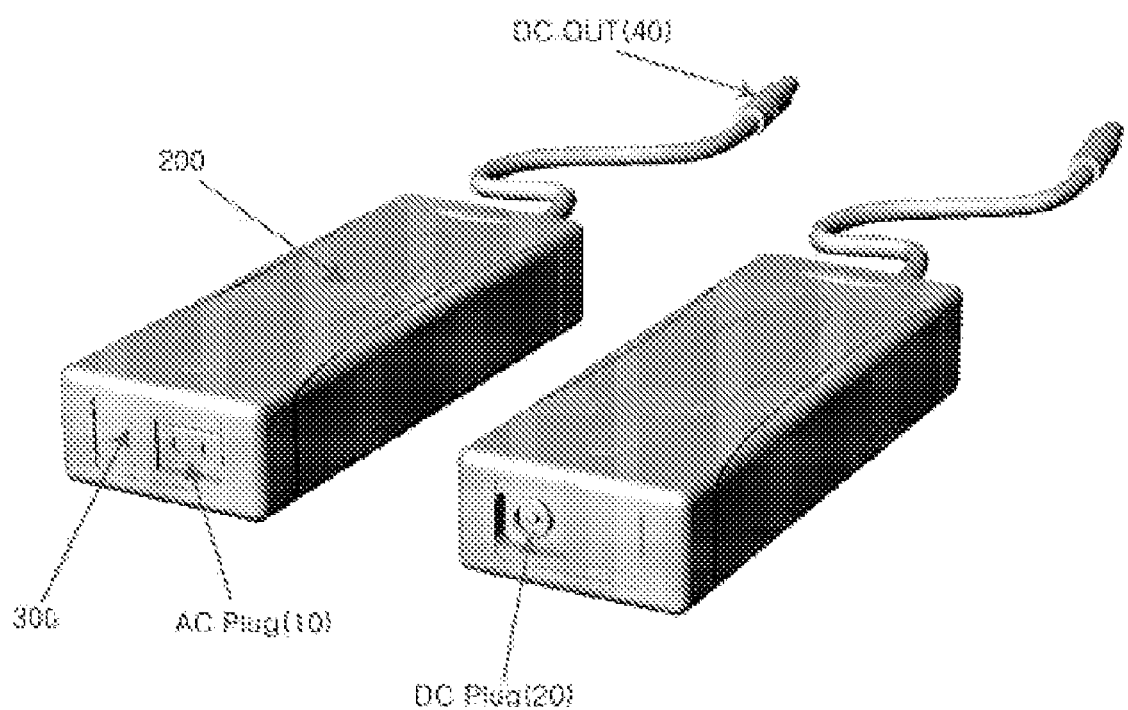
FIG. 3 is an exterior view of a power supply for AC/DC and DC/DC conversion according to the present invention.
Figure 4:
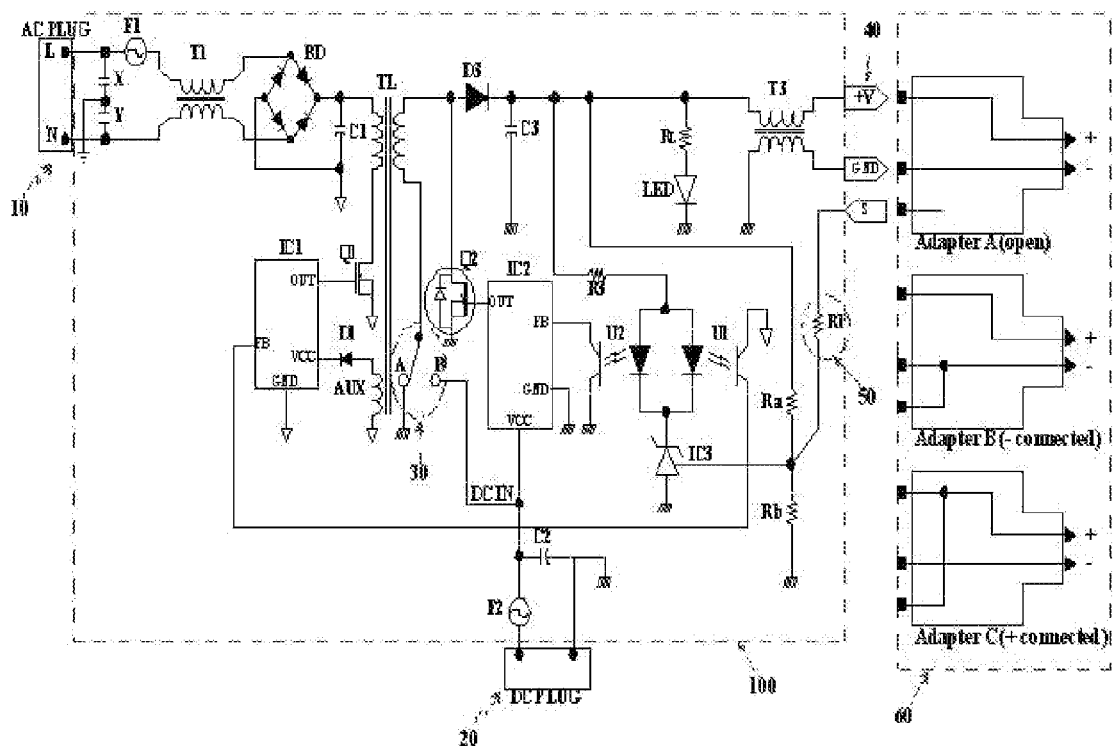
FIG. 4 is a circuit diagram illustrating the constitution of a universal power supply for AC/DC and DC/DC conversion according to the present invention.

As having been described in the foregoing, the present invention provides advantageously a power supply for AC/DC and DC/DC conversion being capable of implementing a decrease in manufacturing costs and its size by using the entire circuit of the secondary side of a transformer for AC/DC conversion as an inductor for performing DC/DC conversion.

Further, the present invention provides advantageously a universal power supply for AC/DC and DC/DC conversion capable of selecting an output voltage by further employing an adapter 60 adequate to electronic products to be used by a user, and an output selector 50 disclosed in US Publication No. 2003/0122523 proposed by the inventors of the present invention.

While the present invention has been described and illustrated herein with reference to the preferred embodiments thereof, it will be apparent to those skilled in the art that various modifications and variations can be made therein without departing from the spirit and scope of the invention. Thus, it is intended that the present invention covers the modifications and variations of this invention that come within the scope of the appended claims and their equivalents.

What is claimed is:

1. A power supply for AC/DC and DC/DC conversion comprising:
   an AC input;
   a DC input;

a single switch for selecting AC input power or DC input power;

a DC output; and a circuit used for AC/DC and DC/DC conversion which converts the power input from the AC input or the DC input to DC power, wherein the single switch is connected to a secondary side of a transformer for AC/DC conversion inside the circuit for AC/DC and DC/DC conversion, and the secondary side serves as an inductor for performing DC/DC conversion when the DC input power is selected, and wherein the circuit used for AD/DC and DC/DC conversion includes:

an AC/DC conversion circuit including:

a rectifier electrically connected between the AC input and the transformer; and a first pulse width modulation controller electrically connected to the transformer; and a DC/DC conversion circuit including a second pulse width modulation controller electrically connected to the secondary side of the transformer.

* * * * *